United States Patent
Fornara et al.

(10) Patent No.: US 8,672,540 B2
(45) Date of Patent: Mar. 18, 2014

(54) DEVICE FOR MONITORING THE TEMPERATURE OF AN ELEMENT

(75) Inventors: Pascal Fornara, Pourrieres (FR); Christian Rivero, Luynes (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 970 days.

(21) Appl. No.: 12/643,537

(22) Filed: Dec. 21, 2009

(65) Prior Publication Data

US 2010/0158072 A1  Jun. 24, 2010

(30) Foreign Application Priority Data

Dec. 24, 2008 (FR) ..................... 08 59055

(51) Int. Cl.
*G01K 7/00* (2006.01)

(52) U.S. Cl.
USPC .......................... 374/178; 374/185

(58) Field of Classification Search
USPC ................... 374/163, 183, 184, 178
See application file for complete search history.

(56) References Cited

U.S. PATENT DOCUMENTS

| 5,917,226 A | 6/1999 | Chan et al. |
| 2004/0201313 A1 | 10/2004 | Wong |
| 2007/0108540 A1 | 5/2007 | Cuxart |
| 2007/0273463 A1 | 11/2007 | Yazdi |

FOREIGN PATENT DOCUMENTS

WO  WO 2004/061887 A1  7/2004

OTHER PUBLICATIONS

French Search Report dated Jul. 22, 2009 from corresponding French Application No. 0859055.

*Primary Examiner* — Mirellys Jagan
(74) *Attorney, Agent, or Firm* — Wolf, Greenfield & Sacks, P.C.

(57) ABSTRACT

A device for monitoring the temperature surrounding a circuit, including: a charge storage element; a charge evacuation device; and a thermo-mechanical switch connecting the storage element to the evacuation element, the switch being capable of closing without the circuit being electrically powered, when the temperature exceeds a threshold.

16 Claims, 3 Drawing Sheets

DEVICE FOR MONITORING THE TEMPERATURE OF AN ELEMENT

CROSS REFERENCE TO RELATED APPLICATIONS

This application claims the priority benefit of French patent application Ser. No. 08/59055, filed on Dec. 24, 2008, entitled "DEVICE FOR MONITORING THE TEMPERATURE OF AN ELEMENT," which is hereby incorporated by reference to the maximum extent allowable by law.

BACKGROUND OF THE INVENTION

1. Field of the Invention

The present invention relates to a device and a method for monitoring the temperature of an element. More specifically, the present invention relates to a device and a method enabling to check that the temperature of the element has not exceeded a threshold.

2. Discussion of the Related Art

Various techniques for monitoring the temperature of a product are known. A first technique comprises placing, on a product, an electronic circuit which periodically stores the product temperature in a memory. An appropriate reading device then enables extraction of the stored values. It can thus be checked that the product has not been overheated. Such a technique requires that the circuit is powered.

A second technique comprises placing, on a product that should remain chilled, a color chip which irreversibly changes color when the product temperature has exceeded a threshold. Such chip are generally formed of temperature-sensitive microorganisms. Thus, consumers are informed of the freshness of the product. This solution is not reversible and only works for temperatures below 10° C.

It would be desirable to have a reusable device and a method for monitoring the temperature of an element, with a design adaptable according to the temperature threshold which is desired to be detected and requiring no permanent powering.

SUMMARY OF THE INVENTION

An object of an embodiment of the present invention is to provide a device and a method for monitoring the temperature of an element, which does not need continuous powering.

Another object of an embodiment of the present invention is to provide a reusable device.

Another object of an embodiment of the present invention is to provide a device which is manufactured with conventional electronic component manufacturing steps.

Thus, an embodiment of the present invention provides a device for monitoring the temperature surrounding the circuit, comprising a charge storage element, a charge evacuation device, and a thermo-mechanical switch connecting the storage element to the evacuation element, the switch being capable of turning on without the circuit being electrically powered, when the temperature exceeds a threshold.

According to an embodiment of the present invention, the circuit further comprises a device for reading the amount of charge in the storage element.

According to an embodiment of the present invention, the thermo-mechanical switch is formed of two metal strips having opposite ends separated by a distance adapted to decrease as the temperature increases and to come down to zero when the temperature exceeds the threshold.

According to an embodiment of the present invention, the circuit comprises an interconnect stack in which the metal strips are formed, the ends of the strips being separated by a region filled with air formed in the interconnect stack.

According to an embodiment of the present invention, the metal strips are made of copper or aluminum.

According to an embodiment of the present invention, the storage element is formed of a dual-gate MOS transistor comprising a control gate and a floating gate, the floating gate being connected to the thermo-mechanical switch.

According to an embodiment of the present invention, the charge evacuation element is formed by a contact between the thermo-mechanical switch and the substrate in and on which the circuit is formed.

Another embodiment of the present invention provides a method for monitoring the temperature of an element, comprising the steps of: powering a circuit attached to the element to inject charges into a charge storage element of this circuit; removing the power; causing an evacuation of the charges if the temperature exceeds a temperature threshold; powering the circuit; and reading the amount of charges present in the storage element.

The foregoing objects, features, and advantages of the present invention will be discussed in detail in the following non-limiting description of specific embodiments in connection with the accompanying drawings.

DETAILED DESCRIPTION

Figure 1:
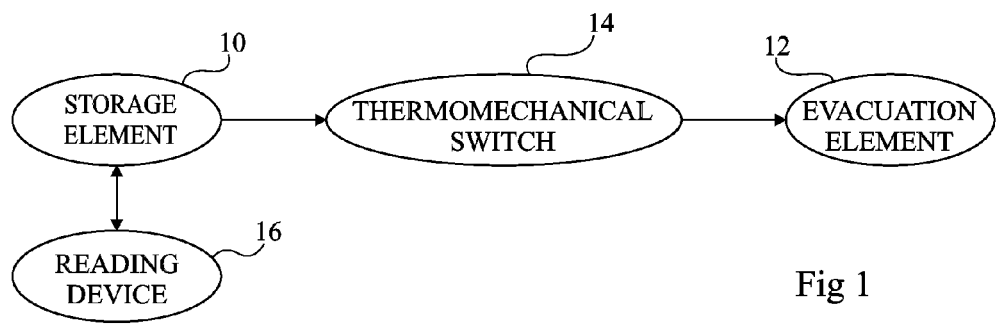
FIG. 1 is a block diagram of a device according to an embodiment of the present invention.

For clarity, the same elements have been designated with the same reference numerals in the different drawings and, further, as usual in the representation of integrated circuits, the various drawings are not to scale.

The inventors provide a circuit and a method for monitoring the temperature surrounding the circuit, requiring no continuous powering during the monitoring. Such a circuit may, for example, be used to make sure that the temperature of a product, in a transportation phase, does not exceed a threshold above which the product is altered. It may also be used to detect reverse engineering operations on a product. Indeed, such operations generally provide the steps of heating at high temperatures, which can thus be detected. It may also be desired to know the history of the temperature of a product in case a product is returned by a customer to verify that the product has been used by the customer in normal temperature conditions.

FIG. 1 is a block diagram of an embodiment of a device for monitoring the temperature of a product.

The device comprises an electric charge storage element 10 and an element for evacuating charges 12. Storage element 10 and evacuation element 12 are connected via a thermomechanical switch 14 which is provided to close when the temperature exceeds a selected temperature threshold. Storage element 10 is associated with a reading device 16 enabling to determine the amount of charges present in charge storage element 10.

Initially, thermomechanical switch 14 is off. The device is powered to store charges in charge storage element 10. The power is then cut off. If the temperature exceeds the threshold of thermomechanical switch 14, said switch turns on and the charges stored in element 10 evacuate through element 12. As long as the temperature remains below the threshold, thermomechanical switch 14 remains off and the charges remain stored in element 10.

The amount of charges present in element 10 is thus representative of the fact that the product has been placed in an environment which is overheated with respect to a threshold, since a last initialization step during which charges have been introduced. Reading device 16 is powered when this amount of charges is desired to be determined after the monitoring phase.

Figure 2:
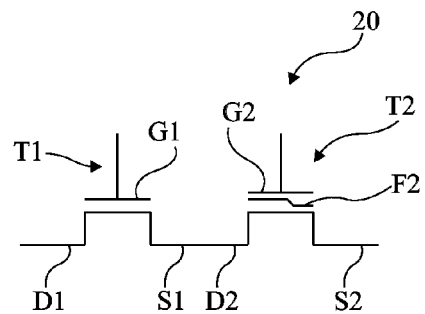
FIG. 2 is an electric diagram of a conventional memory cell constitutive of EEPROMs.

FIG. 2 is an electric diagram of a conventional memory cell 20 constitutive of EEPROMs.

Memory cell 20 comprises a selection transistor T1 and a storage transistor or memory point T2. Transistor T1 is a MOS transistor comprising a drain D1, a source S1, and an insulated gate G1. Memory point T2 is of dual-gate type. It comprises a drain D2, a source S2, and two insulated gates, that is, a floating gate F2 and a control gate G2. A memory point T2, having its floating gate insulator F2 comprising at least a portion sufficiently thin to enable a passing by tunnel effect of carriers between the underlying channel and the floating gate is here considered. The floating gate insulator is called "tunnel insulator" or "tunnel oxide". Source S1 of transistor T1 is connected to drain D2 of memory point T2.

Figure 3:
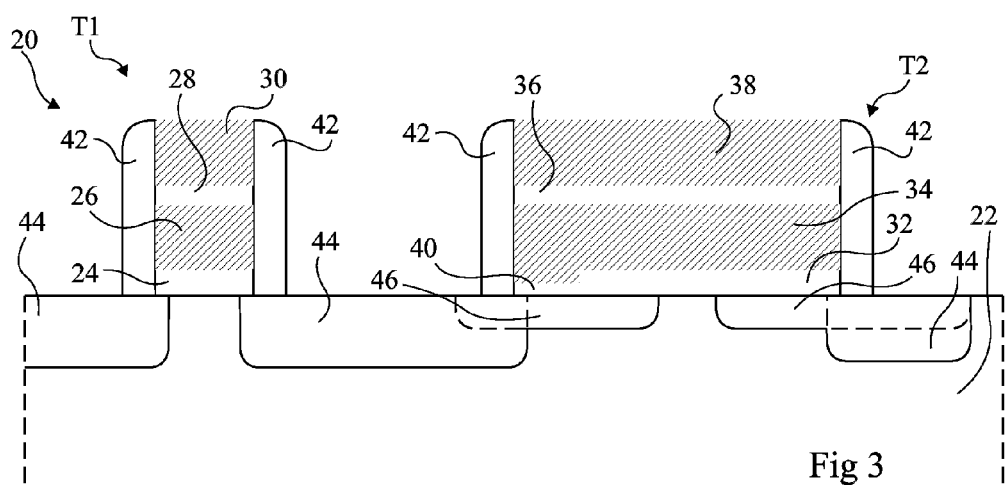
FIG. 3 is a cross-section view of the cell of FIG. 2.

FIG. 3 is a cross-section view of memory cell 20 of FIG. 2.

Memory cell 20 is formed in an active region of a semiconductor substrate 22, typically made of silicon, and laterally delimited by field insulation areas (not shown). Above semiconductor substrate 22 are formed the gate structures of transistor T1 and of memory point T2. The gate of transistor T1 is formed of a stacking of a first insulating portion 24, of a first conductive portion 26, of a second insulating portion 28, and of a second conductive portion 30. It may be desirable for the operation of selection transistor T1 to be similar to that of a single-gate conventional MOS transistor. For this purpose, conductive portions 26 and 30 are short-circuited by metal tracks and vias, not shown.

The gate of memory point T2 is formed of a stack of a first insulating portion 32, of a first conductive portion 34, of a second insulating portion 36, and of a second conductive portion 38. Conductive portion 34 forms floating gate F2 of memory point T2. Insulating portion 32 comprises a relatively thick portion forming the non-tunnel portion of the insulator of floating gate F2 and a relatively thin portion 40 forming the tunnel oxide area. Spacers 42 are formed on either side of selection transistor T1 and of memory point T2.

On either side of selection transistor T1 and of memory point T2, in substrate 22, are formed drain and source implantation areas 44 of these elements. Two other implantation areas 46 are formed at the surface of substrate 22 and partly extend under insulating portion 32 of the memory point.

According to the voltages applied between drain D2 and source S2 and on control gate G2 of the memory point, electrons may be injected into floating gate F2/34 to set the memory point to a so-called "programmed" state. It is then possible to evacuate the charges stored in the floating gate by applying adapted voltages on the gate, the drain, and the source of memory point T2.

The inventors provide using the charge retention properties of an EEPROM cell, modified to form charge storage element 10 of FIG. 1.

Figure 4:
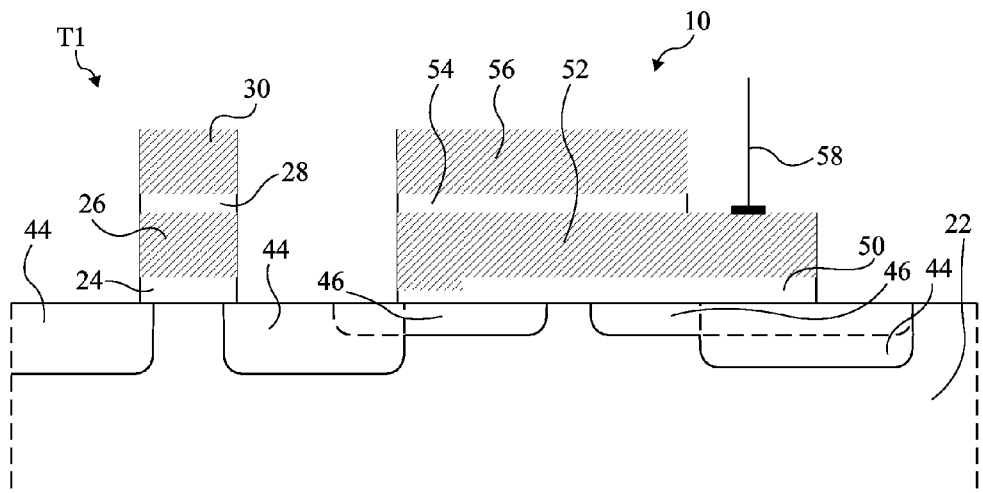
FIG. 4 shows a charge storage element that can be used in a circuit according to an embodiment of the present invention.

FIG. 4 shows such a modified cell 10. Cell 10 comprises a selection transistor T1 identical to that of FIG. 3, formed on a substrate 22 having doped regions (44 and 46) identical to the regions of FIG. 3. Cell 10 also comprises a memory point having its gate formed of a stack of a first insulating layer 50, of a first conductive layer 52, of a second insulating layer 54, and of a second conductive layer 56. First insulating layer 50 comprises a thinner region to enable the passing of carriers by tunnel effect.

First insulating layer 50 and first conductive layer 52 extend, at the surface of substrate 22, over a greater surface area than second insulating layer 54 and second conductive layer 56. A contact 58 is taken on top of first conductive layer 52 and is intended to be connected to thermomechanical switch 14. Thus, by means of selection transistor T1, charges may be injected into floating gate 52 of memory point 10 having its gate connected to an initially off thermomechanical switch 14.

Figure 5:
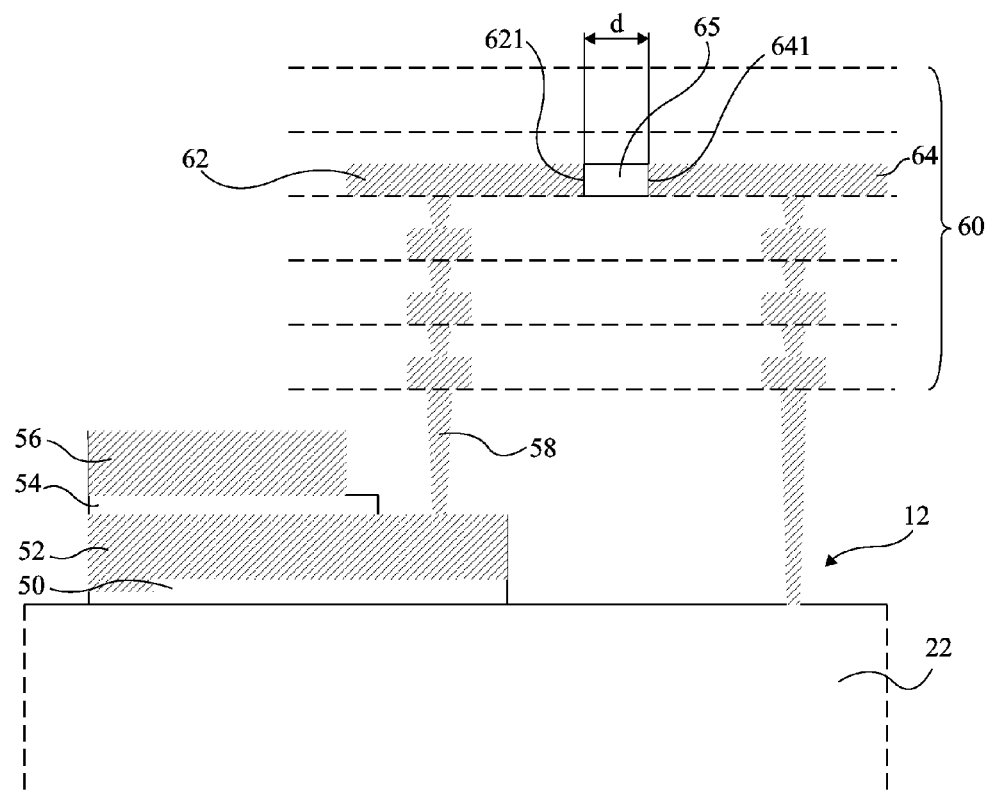
FIG. 5 shows a thermo-mechanical switch and a charge evacuation element that can be used in a circuit according to an embodiment of the present invention.

FIG. 5 shows an example of a thermomechanical switch that may be used in a device such as that of FIG. 1.

FIG. 5 shows memory point 10 having its floating gate 52 extending on substrate 22 over a greater distance than control gate 56. Contact 58 is connected, via several interconnect levels 60 usually comprised in an integrated circuit, to a first metal strip 62 formed in an upper interconnect level. First metal strip 62 forms a first portion of thermomechanical switch 14. A second metal strip 64, in the same interconnect level as strip 62, forms the second portion of switch 14. As an example, first and second metal strips 62 and 64 may be made of copper or aluminum. First and second metal strips 62 and 64 are separated by a cavity 65 filled with air having its length d selected according to the desired threshold. In a heating, the expansion of the metal forming strips 62 and 64 causes a decrease in distance d. When the heating is sufficient, free ends 621 and 641 of the strips come into contact, which functionally closes the switch.

Second metal strip 64 is connected, via metal portions formed in interconnect levels 60, to substrate 22. This connection forms charge evacuation element 12 of FIG. 1. It should be noted that substrate 22 may be provided in different ways to form a resistor through which the charges stored in floating gate 52 evacuate when thermomechanical switch 14 is on. Advantageously, it should be noted that all the steps necessary to the forming of the elements described herein may be carried out by conventional electronic component forming techniques.

The elongation of the copper or aluminum strips according to temperature is equal to $\alpha \cdot \Delta T \cdot I_0$, $\Delta T$ being the temperature difference with respect to a reference temperature, $I_0$ being the size of the metal strip at the reference temperature, and $\alpha$ being the metal elongation coefficient. Coefficient $\alpha$ is on the order of $2.36 \cdot 10^{-5}$ for aluminum and on the order of $1.70 \cdot 10^{-5}$ for copper.

The structure of the switch of FIG. 5 may be formed by various known techniques. For example, if the metallization level comprising strips 62 and 64 corresponds to the last metallization level of interconnect stacking 60, metal strips 62 and 64 are formed on a lower insulating layer. Advantageously, interval d required in most applications is sufficiently low for a passivation layer formed on the metal strips not to penetrate into the confined space between strips, which forms cavity 65. If the metallization level comprising strips 62 and 64 is not the last metallization level, cavity 65 may be formed by carrying out an additional etching of the insulator conventionally formed between metal strips 62 and 64. It may be provided to form a cavity 65, around the ends of strips 62 and 64, larger than that disclosed herein. It may also be provided to only form a single metal strip 62 or 64, the expansion of this strip enabling a direct contact with metal vias of a lower interconnect level at one end of the strip or in a central portion thereof.

Figure 6:
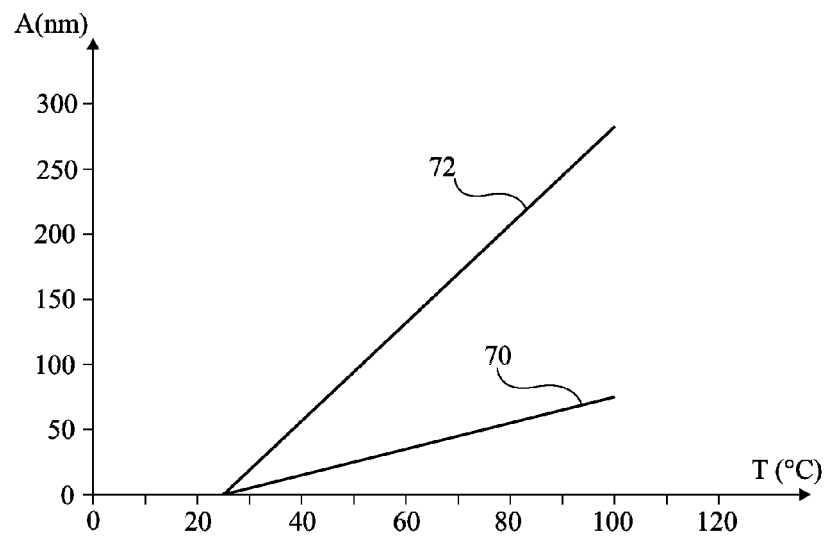
FIG. 6 shows two curves of the elongation of metals according to temperature.

FIG. 6 shows two curves 70 and 72 of the elongation, respectively, of copper and aluminum strips according to temperature. The reference temperature is arbitrarily set to 25° C. and the strip length, at the reference temperature, is equal to 160 μm for the aluminum strip and to 60 μm for the copper strip.

At 85° C., it can be noted that each strip 62 or 64 exhibits an elongation on the order of 230 nm if the strip is made of aluminum and of 60 nm if it is made of copper. Thus, to make sure that a 85° C. temperature is not exceeded, distance d will be provided to be on the order of 460 nm if the strips are made of aluminum and of approximately 120 nm for copper. It should be noted that these values are examples only.

Figure 7:
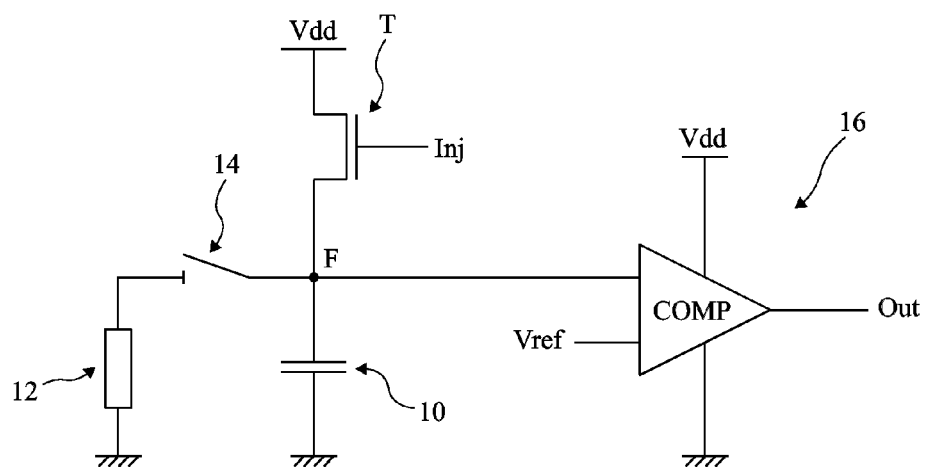
FIG. 7 is an electric diagram of a circuit according to an embodiment of the present invention comprising a reading device.

FIG. 7 is an electric diagram of a circuit according to an embodiment of the present invention and of an example of a reading device 16 associated with the circuit.

The circuit comprises a MOS transistor for injecting charges T, having its gate connected to an injection control signal Inj and having its main terminals connected between a positive supply voltage Vdd and a floating node F. A charge storage element 10 (connection to the substrate), symbolized in FIG. 7 by a capacitor, is connected between floating node F and the ground. A charge evacuation element 12, symbolized by a resistor, is connected via a thermomechanical switch 14 to the floating node. The second terminal of resistor 12 is grounded.

Reading device 16 comprises a comparator COMP having one of its terminals connected to floating node F and having its other terminal biased to a reference voltage Vref, for example, equal to Vdd/2. Comparator COMP is powered. Output Out of the operational amplifier thus is at a first state if the floating node contains charges (switch 14 still off) and at a second state if switch 14 has been closed and the charges of floating node F have been evacuated by resistor 12.

Advantageously, a circuit such as the circuit of FIG. 7 is easily reusable. After a reading of the charges stored at the level of the floating node, it is possible to reinject charges into the charge storage element to perform a new temperature monitoring.

Specific embodiments have been described. Various alterations and modifications will occur to those skilled in the art. In particular, it should be noted that reading device 16 may be different from the reading device shown in FIG. 7. It should further be noted that the metal strips forming thermomechanical switch 14 may be made of any metal or conductive material expanding as the temperature increases. Further, other storage elements than an EEPROM cell may be provided, provided to respect the described storage and charge evacuation functionalities. Finally, although air is a preferred environment for region 65 between the strip ends to enable an expansion thereof, other environments (for example, vacuum, a gas or a liquid) may be used, provided to be compatible with the desired deformation of the metal strips.

It should further be noted that the circuit described herein may be integrated in an electronic device implementing other functions than the temperature monitoring, where this electronic device can be powered during the temperature monitoring. It may also be provided to place several monitoring devices such as that disclosed herein on a same product to detect the overheating of this product above different temperatures.

The circuit described herein may also be used to monitor the temperature of an integrated circuit including electronic components. In such a case, the storage and charge evacuation elements could be formed on the same integrated circuit as the one including the electronic components.

Advantageously, the monitoring circuit is formed in CMOS technology. If the monitored circuit is also in CMOS technology, the integration of the monitoring circuit does not involve any specific fabrication step.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for monitoring the temperature surrounding the circuit, comprising:
    a charge storage element;
    a charge evacuation element;
    a thermo-mechanical switch connecting the storage element to the evacuation element, said switch being capable of closing without the circuit being electrically powered, when the temperature exceeds a threshold, wherein the thermo-mechanical switch is formed of two metal strips having opposite ends separated by a distance adapted to decreasing as the temperature increases and to come down to zero when the temperature exceeds the threshold; and
    a device for reading the amount of charge in the storage element.

2. The circuit of claim 1, comprising an interconnect stack in which the metal strips are formed, the ends of the strips being separated by a region filled with air formed in the interconnect stack.

3. The circuit of claim 1, wherein the metal strips are made of copper or aluminum.

4. The circuit of claim 1, wherein the storage element is formed of a dual-gate MOS transistor comprising a control gate and a floating gate, the floating gate being connected to the thermo-mechanical switch.

5. The circuit of claim 1, wherein the charge evacuation element is formed of a contact between the thermo-mechanical switch and a substrate in and on which the circuit is formed.

6. The circuit of claim 1, formed using CMOS technology.

7. An integrated circuit comprising CMOS components implementing the circuit according to claim 1.

8. A temperature monitoring circuit comprising:
    a charge storage element;
    a thermo-mechanical switch connected to the charge storage element and configured to discharge the charge storage element when the temperature exceeds a temperature threshold; and
    a monitoring device configured to read a charge in the charge storage element, the charge being indicative of whether the temperature threshold has been exceeded, wherein the charge storage element comprises a floating gate of a floating gate transistor.

9. A temperature monitoring circuit as defined in claim 8, wherein the floating gate includes a contact for connection of the floating gate to the thermo-mechanical switch.

10. A temperature monitoring circuit as defined in claim 8, further comprising a selection transistor configured to inject charge into the floating gate of the floating gate transistor.

11. A temperature monitoring circuit as defined in claim 8, wherein the thermo-mechanical switch includes conductive elements separated by a gap.

12. A temperature monitoring circuit as defined in claim 8, further comprising a discharge element coupled to the thermo-mechanical switch and configured to discharge the charge storage element when the thermo-mechanical switch is closed.

13. A temperature monitoring circuit as defined in claim 12, wherein the discharge element is connected between the thermo-mechanical switch and a substrate on which the temperature monitoring circuit is formed.

14. A temperature monitoring circuit as defined in claim 8, wherein the thermo-mechanical switch comprises metal strips separated by a gap.

15. A temperature monitoring circuit as defined in claim 14, wherein a dimension of the gap between the metal strips establishes, at least in part, the temperature threshold.

16. A temperature monitoring circuit as defined in claim 14, wherein the metal strips comprise copper or aluminum.

* * * * *